United States Patent
Chen et al.

(10) Patent No.: US 12,034,986 B2
(45) Date of Patent: Jul. 9, 2024

(54) NETWORK LIVE-BROADCASTING METHOD AND APPARATUS

(71) Applicant: ALIBABA GROUP HOLDING LIMITED, Grand Cayman (KY)

(72) Inventors: Jufeng Chen, Hangzhou (CN); Yuhong Guan, Hangzhou (CN); Changding Liu, Hangzhou (CN); Gaowei Chang, Hangzhou (CN); Jie Shi, Hangzhou (CN); Wentao Wan, Hangzhou (CN); Shuncai Miao, Hangzhou (CN); Chen Bi, Hangzhou (CN); Peifeng Liu, Hangzhou (CN); Yi Xie, Hangzhou (CN); Youli Zhang, Hangzhou (CN); Dong Qin, Hangzhou (CN); Chuan Yang, Hangzhou (CN); Qingfeng Lai, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/106,642

(22) Filed: Nov. 30, 2020

(65) Prior Publication Data

US 2021/0112288 A1 Apr. 15, 2021

Related U.S. Application Data

(63) Continuation of application No. PCT/CN2019/086961, filed on May 15, 2019.

(30) Foreign Application Priority Data

May 28, 2018 (CN) .......................... 201810524204.3

(51) Int. Cl.
H04N 21/2187 (2011.01)
H04L 9/40 (2022.01)
(Continued)

(52) U.S. Cl.
CPC ......... *H04N 21/235* (2013.01); *H04N 21/242* (2013.01); *H04N 21/4353* (2013.01)

(58) Field of Classification Search
None
See application file for complete search history.

(56) References Cited

U.S. PATENT DOCUMENTS 6,728,753 B1 4/2004 Parasnis et al.
6,952,697 B1 10/2005 Rothschild
(Continued)

FOREIGN PATENT DOCUMENTS

CN 1849825 10/2006
CN 101964790 A 2/2011
(Continued)

OTHER PUBLICATIONS

Written opinion of the International Searching Authority in related International Application No. PCT/CN2019/086961, dated Jul. 24, 2019 (9 pgs.).

(Continued)

*Primary Examiner* — Hsiungfei Peng
(74) *Attorney, Agent, or Firm* — Finnegan, Henderson, Farabow, Garrett & Dunner, LLP

(57) ABSTRACT

Embodiments of the present disclosure provide network live-broadcasting methods and devices. The method can include: obtaining live-broadcasting data from a server side; obtaining service data from the server side; determining whether the obtained live-broadcasting data contains key information, wherein the key information is inserted by a live-broadcasting side in the live-broadcasting data when predetermined content corresponding to the service data is included in the live-broadcasting data; and outputting, in response to receiving the key information, the service data on a playing interface of the live-broadcasting data, so that (Continued)

the service data is output synchronously with the predetermined content.

18 Claims, 15 Drawing Sheets

(51) Int. Cl.
*H04N 21/235* (2011.01)
*H04N 21/242* (2011.01)
*H04N 21/43* (2011.01)
*H04N 21/433* (2011.01)
*H04N 21/435* (2011.01)
*H04N 21/8547* (2011.01)

(56) References Cited

U.S. PATENT DOCUMENTS

| | | | |
|---|---|---|---|
| 7,076,434 | B1 | 7/2006 | Newnam et al. |
| 9,973,819 | B1 | 5/2018 | Taylor et al. |
| 2002/0188943 | A1 | 12/2002 | Freeman et al. |
| 2004/0210472 | A1* | 10/2004 | Lew ............... G06Q 30/0203 705/7.32 |
| 2006/0107195 | A1* | 5/2006 | Ramaswamy ....... H04N 21/435 715/203 |
| 2009/0094632 | A1 | 4/2009 | Newnam et al. |
| 2011/0145582 | A1 | 6/2011 | Han et al. |
| 2013/0208027 | A1 | 8/2013 | Bae et al. |
| 2014/0046775 | A1 | 2/2014 | Harb |
| 2017/0256287 | A1 | 9/2017 | Garrett et al. |
| 2018/0152764 | A1 | 5/2018 | Taylor et al. |
| 2019/0268614 | A1* | 8/2019 | Andersson ........... H04N 19/187 |

FOREIGN PATENT DOCUMENTS

| | | | |
|---|---|---|---|
| CN | 103632332 | A | 3/2014 |
| CN | 104168491 | A | 11/2014 |
| CN | 104618798 | A | 5/2015 |
| CN | 104735552 | A | 6/2015 |
| CN | 105812852 | A | 7/2016 |
| CN | 106488291 | A | 3/2017 |
| CN | 107105324 | A | 8/2017 |
| CN | 107682715 | A | 2/2018 |
| JP | 2004048782 | A | 2/2004 |
| JP | 2015520536 | A | 7/2015 |
| WO | WO 2019/228187 | A1 | 12/2019 |

OTHER PUBLICATIONS

International Search Report in related International Application No. PCT/CN2019/086961, dated Jul. 24, 2019 (5 pgs.).
Extended European search report in related European Application No. 19812047.9, dated Mar. 3, 2021 (10 pgs.).
First Search Report issued by Chinese Patent Office in corresponding with the Chinese Application No. CN 201810524204, dated Apr. 1, 2021. (3 pages).
First Office Action issued in corresponding Chinese Application No. 201810524204.3 dated Apr. 13, 2021 (14 pages).
Second Office Action issued in corresponding Chinese Application No. 201810524204.3 dated Sep. 9, 2021 (16 pages).
Guo, Guanglu, "Live technology research of massive stream media based on multicast," China Master's Theses Full-text Database, Feb. 15, 2016, 72 pages.
He, Tianping, "Behind the "carnival" of Live Quiz: From foreign experience to practical reflection," News and Writing, Mar. 31, 2018, 4 pages.
Xia, DeYuan, "Live Quiz Game: new chance or a gust of wind?," Media Review, Feb. 28, 2018, 4 pages.
Japanese Office Action issued in corresponding Japanese Application No. 2020-563711 dated May 2, 2023 (8 pages).
Japanese Search Report issued in corresponding Japanese Application No. 2020-563711 dated Apr. 14, 2023 (88 pages).
Phuoc et al., "Design and Implementation of Versatile Live Multimedia Streaming for IP Network Camera," IEEE, The 2013 International Conference on Advanced Technologies for Communications, pp. 525-530, 2014.
Broadcast Communication Cooperation Service, Research Annual-Report May 31, 2013-2014, pp. 16-21. (cited in Japanese Search Report and was unable to obtain this reference).

* cited by examiner

NETWORK LIVE-BROADCASTING METHOD AND APPARATUS

CROSS-REFERENCE TO RELATED APPLICATION

The present disclosure claims the benefits of priority to International Application PCT/CN2019/086961, filed on May 15, 2019, which claims priority to Chinese Patent Application No. 201810524204.3 filed on May 28, 2018, both of which are incorporated herein by reference in their entireties.

BACKGROUND

Along with the development of the Internet technology and stream medium technology, network-live broadcasting has rapidly been developing. Data in network live broadcasting mainly includes live-broadcasting data and service data. Here, the live-broadcasting data is obtained through real-time collection from a live-broadcasting site by a live-broadcasting side, which may comprise images, texts, voice, etc. The obtained live-broadcasting data is then processed, such as encoded, uploaded to a server side, distributed by the server side to a client side, and processed, such as decoded, and played by the client side, so that a viewing user can view the live-broadcasting data through the client side. The server side provides service data that mainly refers to data related to the live-broadcasting data. The service data includes a number of online viewers, comment data, and the like, and can be displayed by the client side on a playing interface of the live-broadcasting data.

The live-broadcasting data needs to be processed, such as encoded, by a live-broadcasting side and then uploaded to the server side, which distributes the processed live-broadcasting data to the client side, while the service data is obtained by the client side directly from the server side. The network latency of the live-broadcasting data is greater than that of the service data. In practical applications, there are cases where predetermined content in the service data and the live-broadcasting data is output simultaneously. But due to the greater network latency of the live-broadcasting data, the predetermined content in the live-broadcasting data may not be played when the service data has been output, leading to the problem that the predetermined content in the live-broadcasting data cannot be output synchronously with the service data.

SUMMARY

Embodiments of the present disclosure provide network live-broadcasting methods and devices. The method can include: obtaining live-broadcasting data from a server side; obtaining service data from the server side; determining whether the obtained live-broadcasting data contains key information, wherein the key information is inserted by a live-broadcasting side in the live-broadcasting data when predetermined content corresponding to the service data is included in the live-broadcasting data; and outputting, in response to receiving the key information, the service data on a playing interface of the live-broadcasting data, so that the service data is output synchronously with the predetermined content.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings.

DETAILED DESCRIPTION

Figure 1:
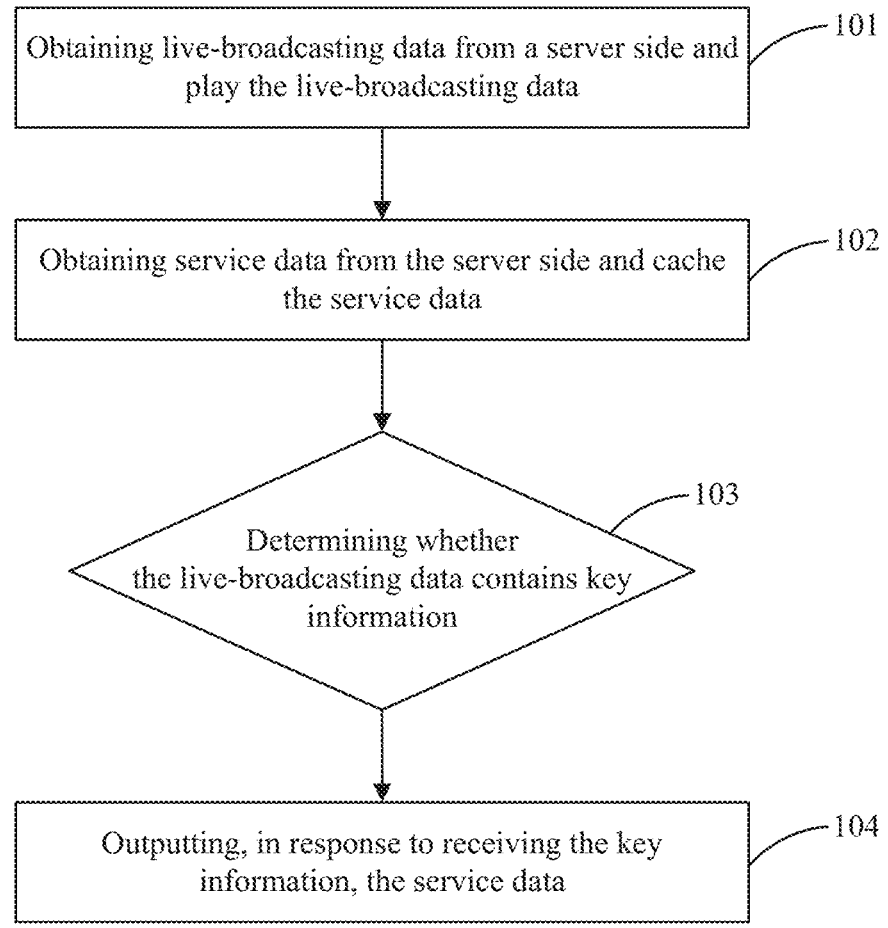
FIG. 1 is a flowchart of an exemplary live-broadcasting method, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms and/or definitions incorporated by reference.

It is appreciated that terms "first," "second," and so on used in the specification, claims, and the drawings of the present disclosure are used to distinguish similar objects. These terms do not necessarily describe a particular order or sequence. The objects described using these terms can be interchanged in appropriate circumstances. That is, the procedures described in the exemplary embodiments of the present disclosure could be implemented in an order other than those shown or described herein. In addition, terms such as "comprise," "include," and "have" as well as their variations are intended to cover non-exclusive inclusion. For example, a process, method, system, product, or device including a series of steps or units are not necessarily limited to the steps or units clearly listed. In some embodiments, they may include other steps or units that are not clearly listed or inherent to the process, method, product, or device.

Some embodiments of the present disclosure are mainly used in network live-broadcasting scenarios, in particular video live-broadcasting scenarios. Network live-broadcasting refers to a manner in which live-broadcasting data can be viewed on different communication platforms at the same time through a network system, and online interaction can also be realized.

Embodiments of the present disclosure can provide a network live-broadcasting method and device, a terminal, and a server to address the situation where service data and predetermined content in live-broadcasting data cannot be output synchronously.

Data in network live-broadcasting mainly includes live-broadcasting data and service data. The live-broadcasting data is collected and uploaded to a server side by a live-broadcasting side. The live-broadcasting side often uses an OBS (Open Broadcaster Software) pushing device to process the live-broadcasting data collected by a collection device, and then push the same to a server side. The live-broadcasting data can be audio data or video data, and can integrate plentiful elements such as images, texts, voice, etc. In practical applications, the live-broadcasting data is typically obtained by collecting field images and audio, as well as live commentary at the same time events take place at a live broadcasting site. Therefore, a viewing user can intuitively feel an event at the site according to live-broadcast content in the live-broadcasting data.

The service data is data related to the live-broadcasting data and provided by the server side, such as a number of online viewers, comment data, and the like. In a practical application, in order to realize better online interaction, a host at a live-broadcasting site can broadcast question information, or the question information can be displayed in text or other manners at the live-broadcasting site, and viewing users can be asked to answer the questions in an interactive manner. In order to realize interactive question answering by the viewing users, the service data can refer to displayable data comprising the question information, such as text data or image data. When the host at the live-broadcasting site broadcasts the question information and asks viewing users to answer the questions, the client side can output answer widgets to present the service data comprising the question information, thereby enabling the viewing users both to listen to or see the live-broadcasting data to obtain the question information and to execute an answer operation through the answer widgets output by the client side and comprising the question information. It can be seen that the service data and particular live-broadcasting content in the live-broadcasting data need to be presented to the viewing users at the same moment, i.e., synchronously output at the client side. However, a situation can occur, due to reasons like network latency, that a host has broadcasted a question but the question information is not output or that question information has been output but the host has not broadcast the question.

Embodiments are provided to address the situation that predetermined content in the live-broadcasting data cannot be output synchronously with the service data. In some embodiments of the present disclosure, a client side obtains service data from a server side and caches the service data locally; a live-broadcasting side inserts key information when predetermined content is included in the live-broadcasting data, and thus the client side detects the key information in the live-broadcasting data and outputs, if the key information is detected and obtained, the service data on a playing interface of the live-broadcasting data. The service data is related to the predetermined content, the output timing of the service data is controlled by the key information, such that the predetermined content of the live-broadcasting data and the service data can be output synchronously, thereby improving the synchronous rate between the live-broadcasting data and the service data.

FIG. 1 is a flowchart of an exemplary live-broadcasting method, consistent with some embodiments of the present disclosure. The method can be performed by a client side. The method can comprise the following steps.

In step 101, live-broadcasting data is obtained from a server side and play the live-broadcasting data.

In step 102: service data is obtained from the server side and cache the service data. The service data obtained by the client side from the server side can be cached locally first.

In step 103, whether the live-broadcasting data contains key information is determined.

The key information can be inserted by a live-broadcasting side when predetermined content corresponding to the service data is included in the live-broadcasting data; and the predetermined content can be particular content broadcast by a host at a live-broadcasting site or particular content presented at the live-broadcasting site.

The live-broadcasting side can determine that the predetermined content is included in the live-broadcasting data upon receiving a push request. The push request can be triggered when a controller observes that a host at a live-broadcasting site broadcasts particular content or particular content is presented at the live-broadcasting site.

In step 104, in response to receiving the key information, the service data is output on a playing interface of the live-broadcasting data, so that the service data is output synchronously with the predetermined content.

If the key information is detected and obtained, the service data can be output on the playing interface of the live-broadcasting data, such that a viewing user can simultaneously see the predetermined content of the live-broadcasting data and the service data on the playing interface.

The service data can be related to the predetermined content. If the key information is detected and obtained, the key information indicates that the live-broadcasting data played by the client side comprises the predetermined content, and therefore, the service data can be output, so that the predetermined content and the service data can be output synchronously, thereby improving the synchronous rate between the live-broadcasting data and the service data.

Optionally, the key information can comprise a trigger instruction, such that the client side responds to the trigger instruction, and can output the service data. Therefore, the control of the timing to display the service data is realized by using the key information.

The key information can further comprise other content, which will be described in detail in the following embodiments.

Figure 2:
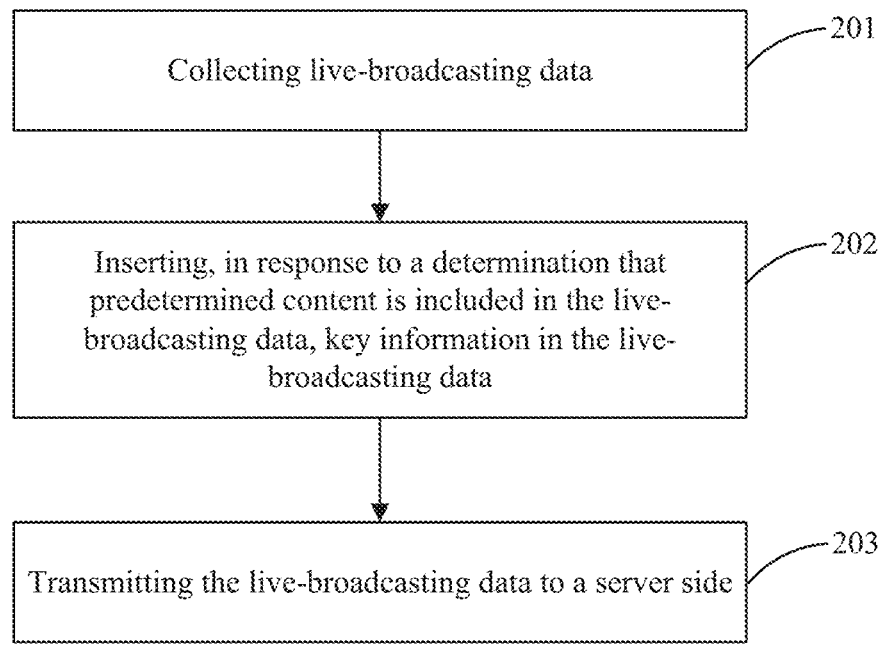
FIG. 2 is a flowchart of an exemplary live-broadcasting method, consistent with some embodiments of the present disclosure.

FIG. 2 is a flowchart of an exemplary live-broadcasting method, consistent with some embodiments of the present disclosure. The method can be performed by a live-broadcasting side. The method can comprise the following steps.

In step 201, live-broadcasting data is collected.

In step 202, if predetermined content corresponding to service data is included in the live-broadcasting data, key information corresponding to the service data is inserted in the live-broadcasting data.

Optionally, if a push request is received, it is determined that the predetermined content corresponding to the service data is included in the live-broadcasting data, and thus the key information is inserted in the live-broadcasting data.

The push request can be triggered by a controller at the live-broadcasting site. The controller observes the development of events at the live-broadcasting site, and can trigger the push request if the predetermined content appears, so that the live-broadcasting side inserts the key information in the live-broadcasting data being currently collected.

In step 203, the live-broadcasting data is transmitted to a server side.

The live-broadcasting data is transmitted to a client side for the client side to play the live-broadcasting data, and when the key information is detected and obtained from the live-broadcasting data, the service data obtained from the server side is output on a playing interface of the live-broadcasting data.

The live-broadcasting side collects the live-broadcasting data in real time. If the live-broadcasting data being currently collected comprises the predetermined content, the key information corresponding to the service data can be inserted in the live-broadcasting data being currently collected and then transmitted to the service side. If the live-broadcasting data being currently collected does not comprise the predetermined content, the live-broadcasting data being currently collected can be directly transmitted to the service side to ensure that the client side can normally play the live-broadcasting data, and the client side can output the service data synchronously when it is detected that the key information is present in the live-broadcasting data.

Figure 3:
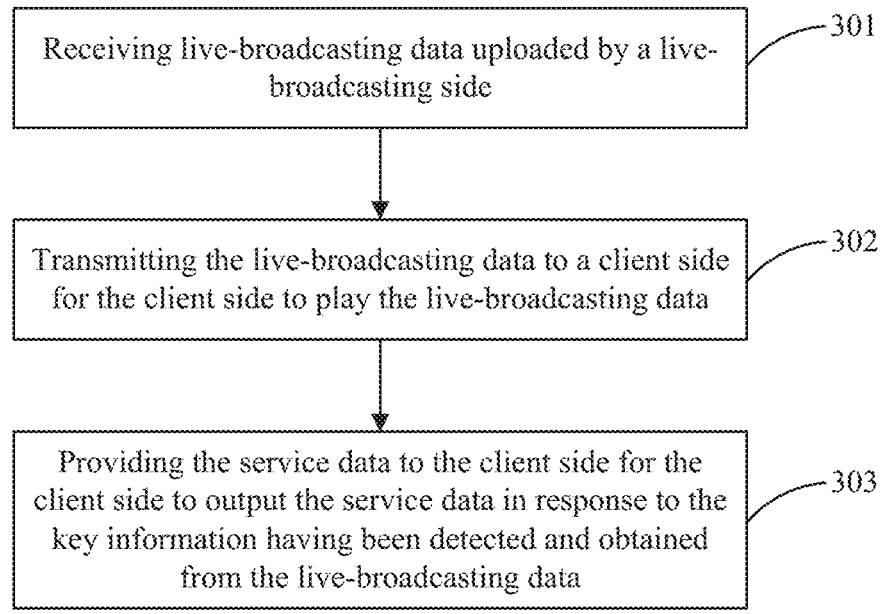
FIG. 3 is a flowchart of an exemplary live-broadcasting method, consistent with some embodiments of the present disclosure.

FIG. 3 is a flowchart of an exemplary live-broadcasting method, consistent with some embodiments of the present disclosure. The method can be performed by a server side. The method can comprise the following steps.

In step 301, live-broadcasting data uploaded by a live-broadcasting side is received.

A live-broadcasting side inserts key information when the live-broadcasting data comprises predetermined content corresponding to service data.

In step 302, the live-broadcasting data is transmitted to a client side for the client side to play the live-broadcasting data.

In step 303, the service data is provided to the client side for the client side to output the service data on a playing interface of the live-broadcasting data when the key information is detected and obtained from the live-broadcasting data.

Figure 4:
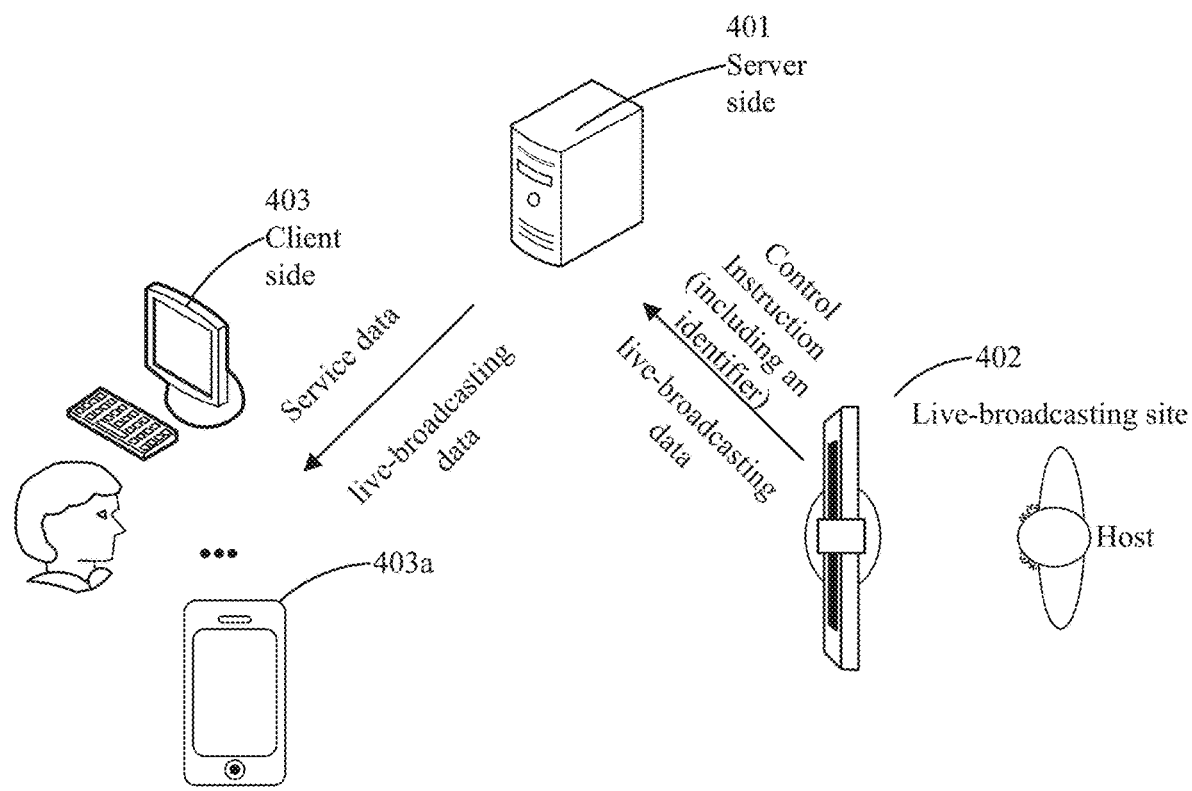
FIG. 4 is a schematic structural diagram of an exemplary live-broadcasting system, consistent with some embodiments of the present disclosure.

FIG. 4 is a schematic structural diagram of an exemplary live-broadcasting system, consistent with some embodiments of the present disclosure. The exemplary network live-broadcasting system consists of a server side 401, a live-broadcasting side 402, and a client side 403. There can be at least one client side 403, the client side can be configured in an electronic device, such as a mobile phone (403a in FIG. 4), a tablet computer, a computer, a smart watch, and the like. The server side 401 can be implemented by using a CDN (Content Delivery Network) system, and the live-broadcasting side 402 can consist of electronic devices having a collection function and an OBS pushing function, such as a smart device like a mobile phone with a camera, a tablet, and the like.

The live-broadcasting side 402 is responsible for collecting, in real time, voice and/or images of the live-broadcasting site, so as to obtain the live-broadcasting data and upload the live-broadcasting data to the server side 401, the server side 401 is responsible for transmitting the live-broadcasting data to the client side 403, and the client side 403 can provide a playing interface to play the live-broadcasting data. It should be understood that the live-broadcasting data can be uploaded to the server side only after processing like encoding, transcoding, and compressing, and accordingly, the client side can play the live-broadcasting data only after processing like decoding, decompressing, etc.

In some embodiments, live-broadcasting data collected by a live-broadcasting side at the current moment T0 can be displayed on a client side at probably a moment T100, and according to the current network environment state, the time interval between T100 and T0 can be between 5 seconds and 15 seconds. However, the client side requests to obtain service data from a server side, and the service data can be returned within 1 second. If the service data is directly output, the service data and the predetermined content in the live-broadcasting data cannot be output synchronously due to network latency.

Therefore, in some embodiments of the present disclosure, the live-broadcasting side 402 collects the live-broadcasting data, and inserts the key information in the live-broadcasting data when the live-broadcasting data comprises predetermined content corresponding to the service data.

The server side 401 can provide the client side 403 with the service data related to the predetermined content.

After obtaining the service data, the client side 403 caches the service data locally first, detects the live-broadcasting data, and if the key information is detected and obtained, outputs the service data on a playing interface of the live-broadcasting data, so as to guarantee that the service data can be output synchronously with the predetermined content of the live-broadcasting data, thereby improving the synchronous rate between the service data and the live-broadcasting data.

In a scenario of live-broadcasting question answering, the service data can be question information, and the predetermined content can, for example, be a particular voice broadcast by a host at the live-broadcasting site for the question information, for example, "begin to answer the question." When a viewing user is viewing the live-broadcasting data and the host broadcasts "begin to answer the question," the client side can promptly output the question information in an answer widget for the viewing user to promptly execute an answer operation for the question information.

In some embodiments, in order to reduce the processing pressure on the server side, the client side can request to obtain the service data by periodically accessing the server side.

In addition, during network live-broadcasting, there can be cases where different live-broadcasting contents have respectively corresponding service data that need to be synchronously output with respective live-broadcasting contents. For example, in a scenario of live-broadcasting question answering, there can be a plurality of pieces of question information, and each time when a host at the live-broadcasting site broadcasts one question, a viewing user can be asked to execute one answer operation.

In order to enable the client side to obtain service data corresponding to predetermined content, some different pieces of service data that are not corresponding to the predetermined content in the server side can be in an invalid state in some embodiments.

If the live-broadcasting data comprises predetermined content corresponding to the service data, a live-broadcasting side can send a control instruction to a server side at the same time when inserting key information in the live-broadcasting data. The control instruction can carry a data identifier of the service data, such that the server side can determine the service data corresponding to the predetermined content upon receiving the control instruction, and set the service data to be in a valid state, while the client side can only obtain the service data in the valid state.

If receiving an obtaining request sent from the client side, the server side only transmits the service data in the valid state to the client side. Since the client side can periodically access the server side, the client side can obtain the service data in the valid state and cache the same locally if the service data is present on the server side, and the predetermined content and the service data corresponding to the predetermined content can be synchronously output through the control instruction.

Furthermore, assuming that the network latency of the live-broadcasting data is 5 seconds and the network latency of the service data is 1 second, then the service data needs to wait for about 4 seconds locally before the live-broadcasting data carrying the key information arrives. Therefore, the service data can be stolen in the transmission process or in the local cache, and it is necessary to ensure data security. In particular, in a scenario of live-broadcasting question answering, there is a time limit for outputting the service data in order to have a time limit for a user to answer questions. If the question information is stolen and some users learn about the question information in advance, the question answering time is increased, leading to undesired compromised fairness in the scenario of live-broadcasting question answering.

Therefore, in some embodiments, the server side can use a first encryption algorithm to encrypt the service data.

In some embodiments, the server side can send a first key of the first encryption algorithm to the live-broadcasting side, the first key being used to decrypt the service data.

Accordingly, the live-broadcasting side can insert the key information comprising the first key when the live-broadcasting data comprises predetermined content corresponding to the service data.

Therefore, the client side can obtain the service data from the server side by obtaining the service data encrypted using the first encryption algorithm from the server side; and The client side can output, in response to receiving the key information, the service data on a playing interface of the live-broadcasting data by decrypting, in response to receiving the key information, the service data using the first key comprised in the key information; and outputting the decrypted service data on a playing interface of the live-broadcasting data.

In some embodiments, if the client side detects and obtains the key information, the client side can obtain the first key from the server side in response to the key information, and then use the first key to decrypt the service data.

By performing encrypted transmission on the service data, the data security can be improved and the risk of being stolen is reduced. Moreover, the key and the service data are transmitted separately, which avoids potential security risk as a result of simultaneous interception. The service data that arrives at the client side early cannot be decrypted since the key cannot be learned, which can ensure that the live-broadcasting data and the service data are synchronous, and also ensure that the key arrives on demand and won't arrive early for early decryption.

The first encryption algorithm can be a symmetric encryption algorithm, and the first key is a private key. The symmetric encryption algorithm can be selected, for example, from AES (Advanced Encryption Standard), DES (Data Encryption Standard), 3DES (Triple DES), RC5 (a block cipher algorithm), and IDEA (International Data Encryption Algorithm).

Since different client sides correspond to different hardware devices and network environments, the network latency of the live-broadcasting data can be different for different client sides. Accordingly, the time of the key information arriving at different client sides can also be different, leading to inconsistent output times of the service data at different client sides. Different viewing users corresponding to different client sides view the service data at different times. There is a need to ensure fairness in a live-broadcasting scenario.

Therefore, in some embodiments, the server side can set a predetermined latency parameter of the service data, and the predetermined latency parameter can comprise two time intervals, a first time interval and a second time interval. The first time interval is smaller than the second time interval.

The server side can send the predetermined latency parameter to the client side, and the predetermined latency parameter can be sent, together with the service data, to the client side.

The client side can determine, by combining the obtaining time of the service data and the predetermined latency parameter, the earliest display time and the latest display time of the service data, and specifically, can determine the earliest display time based on the first time interval and the latest display time based on the second time interval.

Therefore, the client side can perform outputting, in response to receiving the key information, the service data on a playing interface of the live-broadcasting data in the following steps.

If the receiving time of the key information is earlier than the earliest display time of the service data, the client side can wait until the earliest display time to output the service data on the playing interface of the live-broadcasting data.

If the receiving time of the key information is later than the earliest display time of the service data and earlier than the latest display time of the service data, the client side can output the service data on the playing interface of the live-broadcasting data when the client side receives the key information.

In some embodiments, the service data can be encrypted using the first encryption algorithm.

In an optional manner, if the receiving time of the key information is earlier than the earliest display time of the service data, the client side can wait until the earliest display time to use the first key comprised in the key information to decrypt the service data.

If the receiving time of the key information is later than the earliest display time of the service data and earlier than the latest display time of the service data, the client side can directly use the first key comprised in the key information to decrypt the service data.

In another optional manner, it is also feasible to use the first key in the key information to decrypt the service data first, and if the receiving time of the key information is earlier than the earliest display time of the service data, the client side can wait until the earliest display time to output the decrypted service data.

If the receiving time of the key information is later than the earliest display time of the service data and earlier than the latest display time of the service data, the client side can decrypt the service data, and then directly output the decrypted service data.

In some embodiments, if the client side determines that the receiving time of the key information is later than the latest display time of the service data, the client side can discard the service data. If the client side determines that the receiving time of the key information is earlier than the obtaining time of the service data, the client side can discard the key information.

With the restrictions by the earliest display time and the latest display time, it can be ensured, to a certain degree, that the service data is synchronously displayed with the live-broadcasting data in different client sides.

In some embodiments, if the client side does not detect and obtain the key information when the latest display time of the service data is reached, the client side can request to obtain the service data that is not encrypted from the server side and output the service data on the playing interface of the live-broadcasting data.

In addition, to further ensure security, as another optional manner, the server side can also use a second key and a second encryption algorithm to encrypt the service data, and transmit the second key to the client side.

Optionally, the second key can be transmitted to the client side upon receiving a live-broadcasting request from the client side, or the second key can be transmitted to the client side upon receiving an obtaining request from the client side.

Therefore, after the client side obtains the service data encrypted using the first encryption algorithm, the client side can obtain the service data encrypted using the second encryption algorithm from the server side after a first predetermined time.

If the client side does not detect and obtain the key information when the latest display time of the service data is reached, the client side can use the second key to decrypt the service data encrypted using the second encryption algorithm, and output the decrypted service data on the playing interface of the live-broadcasting data.

The first predetermined time can be determined according to the network latency time of the live-broadcasting data, and can be shorter than or equal to the network latency time of the live-broadcasting data.

In addition, if the client side periodically accesses the server side, after the client side obtains the service data encrypted using the first encryption algorithm, the client side can obtain the service data encrypted using the second encryption algorithm from the server side after a predetermined number of accesses.

The first predetermined time can be equal to an interval time corresponding to the predetermined number of accesses, and for example, the client side initiates an access at an interval of 2 seconds, the first predetermined time can be the interval time of 2 accesses, i.e., 4 seconds.

Figure 5:
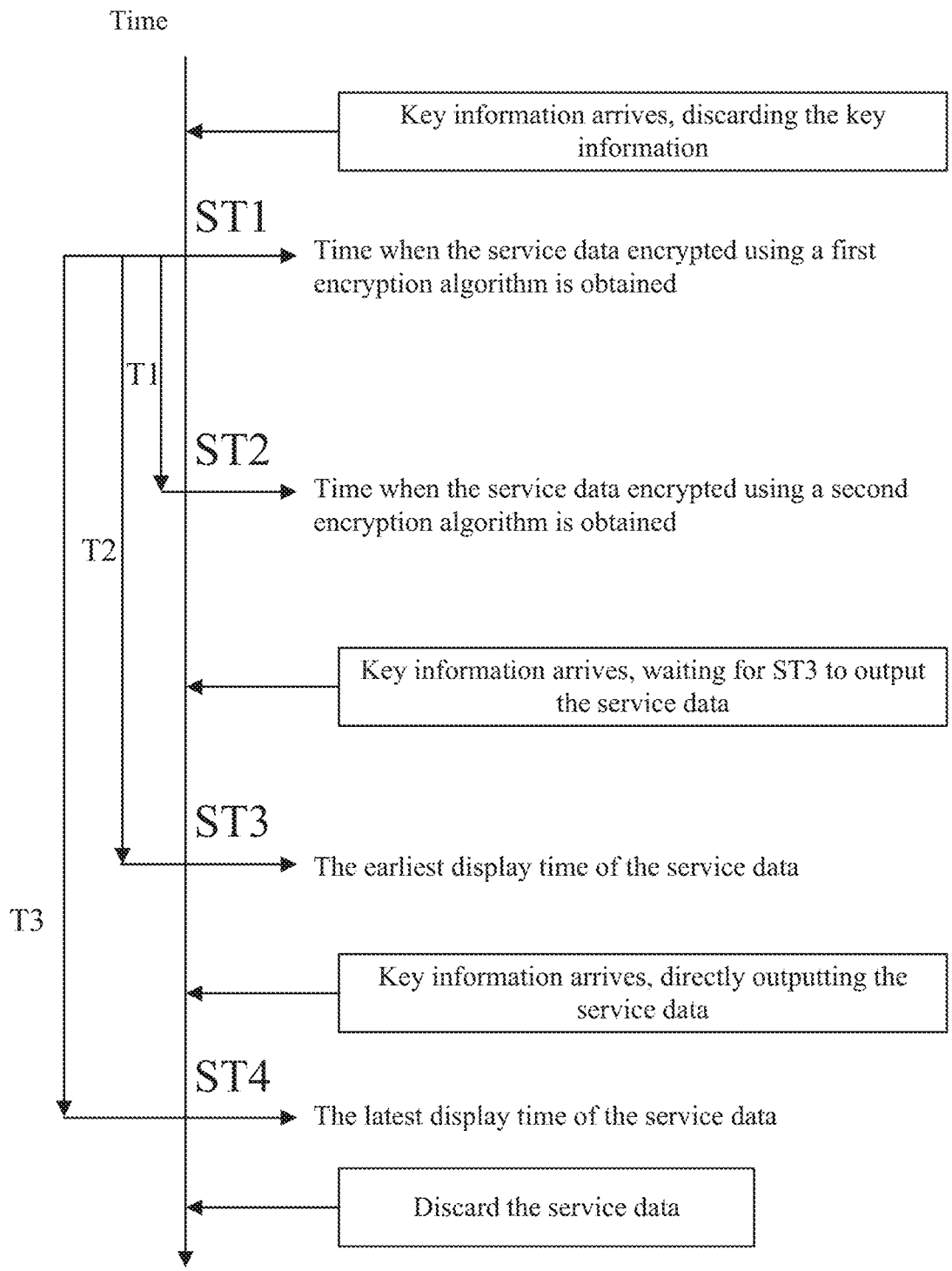
FIG. 5 is a sequence diagram of exemplary data output from a client side, consistent with some embodiments of the present disclosure.

FIG. 5 is a sequence diagram of exemplary data output from a client side, consistent with some embodiments of the present disclosure.

At moment ST1, the client side can obtain service data encrypted using a first encryption algorithm from a server side, the moment ST1 can be the receiving time of the service data.

At moment ST2 after a first predetermined time T1 from the moment ST1, the client side can obtain the service data encrypted using a second encryption algorithm from the server side.

After a first time interval T2 from moment ST1, moment ST3 is the earliest display time of the service data;

After a second time interval T3 from moment ST1, moment ST4 is the latest display time of the service data. Moment ST3 and moment ST4 define a range of display time of the service data.

It can be seen in FIG. 5 that, if the receiving time of the key information is earlier than moment ST1, the key information is discarded.

If the receiving time of the key information is later than moment ST1 and earlier than moment ST3, the client side is configured to wait until moment ST3 to output the service data.

If the receiving time of the key information is later than moment ST3 and earlier than moment ST4, the service data is directly output by the client side.

If the moment ST4 is reached but the key information is not obtained, the second key is used to decrypt the service data encrypted using the second encryption algorithm, and the decrypted service data is output by the client side.

If the moment ST4 is exceeded, the service data is discarded.

The first time interval and the second time interval in the predetermined latency parameter can be dynamically adjusted, so that the receiving time of the key information can be within a time range defined by the earliest display time and the latest display time of the service data, so as to ensure that the service data can be synchronously output with the predetermined content in the live-broadcasting data.

Therefore, the server side can determine whether the receiving times of the key information at different client sides are within the display time range defined by the earliest display time and the latest display time of the service data and can determine statistics regarding that the receiving times of the key information at different client sides are within the display time range; and based on the statistics, can adjust the predetermined latency parameter.

The statistics can, for example, comprise a counted number of times that the receiving times of the key information are within the display time range defined by the earliest display time and the latest display time of the service data. If the counted number of times is greater than a predetermined number of times, no adjustment is needed. If the counted number of times is smaller than a predetermined number of times, the predetermined latency parameter is adjusted until the counted number of times is greater than the predetermined number of times.

The statistics can further comprise a first number of times that the receiving times of the key information corresponding to different client sides are within the display time range defined by the earliest display time and the latest display time of the service data, a second number of times that the receiving time of the key information is earlier than the earliest display time of the service data, and a third number of times that the receiving time of the key information is later than the latest display time of the service data. The first number of times, the second number of times, and the third number of times can be combined to dynamically adjust the predetermined latency parameter. For example, if the first number of times is smaller than a predetermined number of times and the second number of times is greater than a first set value, the first time interval in the predetermined latency parameter can be decreased. If the third number of times is greater than the first set value, the second time interval in the predetermined latency parameter can be increased.

The key information inserted by the live-broadcasting side in the live-broadcasting data can be implemented in a variety of manners.

When the live-broadcasting data comprises video data, a supplemental enhancement information (SEI) frame can be generated based on the key information, the SEI frame can be inserted in the video data, such that the live-broadcasting data carries the key information. The SEI frame can be inserted in the process of encoding the video data by the live-broadcasting side.

In addition, when the live-broadcasting data comprises audio data, the key information can also be converted into particular audio and inserted into the audio data.

Figure 6:
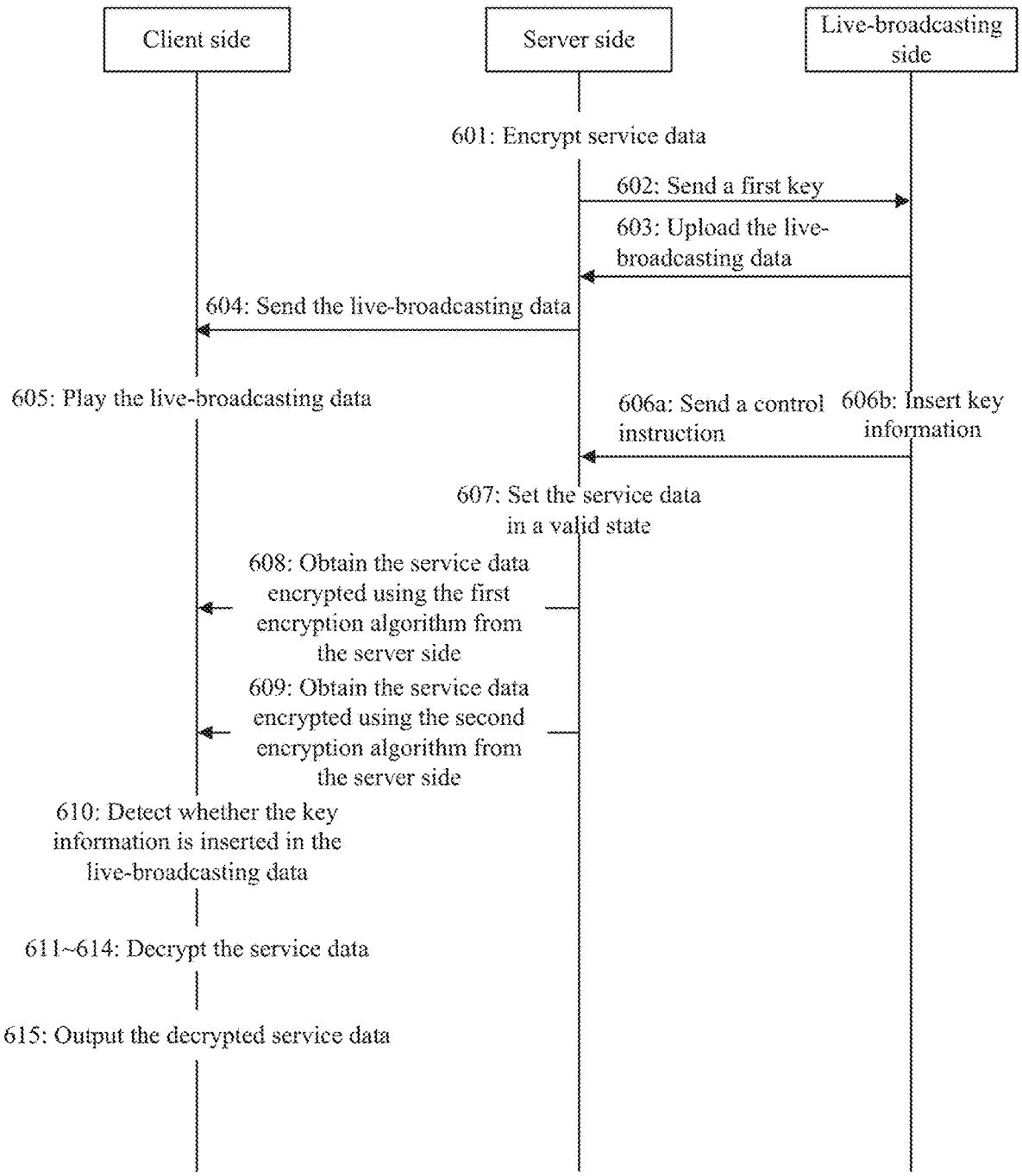
FIG. 6 is a flowchart of an exemplary live-broadcasting method, consistent with some embodiments of the present disclosure.

FIG. 6 is a flowchart of an exemplary live-broadcasting method, consistent with some embodiments of the present disclosure.

In step 601, a server side uses a first encryption algorithm and a second encryption algorithm to encrypt service data, respectively.

In step 602, the server side sends a first key corresponding to the first encryption algorithm to a live-broadcasting side.

The server side specifically uses the first encryption algorithm to encrypt the service data through the first key and uses the second encryption algorithm to encrypt the service data through a second key.

The server side can send the second key corresponding to the second encryption algorithm to a client side when receiving a live-broadcasting request from the client side.

Optionally, first keys corresponding to different pieces of service data can be different from one another, while second keys corresponding to different pieces of service data can be the same, that is, the second key is a general key.

In a scenario of live-broadcasting question answering, different pieces of service data refer to different pieces of question information. These different pieces of question information can be encrypted using the first encryption algorithm through unique first keys respectively and encrypted using the second encryption algorithm through the general second key.

In step 603, the live-broadcasting side collects live-broadcasting data and uploads the live-broadcasting data to the server side.

In step 604, the server side sends the live-broadcasting data to the client side. The server side can send the live-broadcasting data to the client side when receiving a live-broadcasting request from the client side.

In step 605, the client side plays the live-broadcasting data.

When the live-broadcasting data comprises predetermined content, in step 6060a, the live-broadcasting side sends a control instruction to the server side, and at the same time, in step 606b, the live-broadcasting side inserts key information comprising the first key in the live-broadcasting data. After the insertion, the live-broadcasting data being broadcasted to the server side in a live streaming manner contains the key information.

Optionally, the live-broadcasting side can insert the key information comprising the first key in the live-broadcasting data when receiving a push request.

The push request can be triggered when a controller detects that the live-broadcasting data comprises the predetermined content.

In step 607, the server side determines service data corresponding to the predetermined content according to the control instruction, and set the service data in a valid state.

In step 608, the client side periodically accesses the server side to request to obtain the service data in the valid state and encrypted using the first encryption algorithm.

In step 609, after obtaining the service data encrypted using the first encryption algorithm, the client side obtains, after a first predetermined time, the service data in the valid state and encrypted using the second encryption algorithm.

In step 610, the client side detects whether the key information is inserted in the live-broadcasting data.

In step 611, in response to receiving the key information, if the receiving time of the key information is earlier than the earliest display time of the service data, the client side can wait until the earliest display time to decrypt the service data using the first key comprised in the key information.

In step 612, in response to receiving the key information, if the receiving time of the key information is later than the earliest display time of the service data and earlier than the latest display time of the service data, the client side can decrypt the service data using the first key comprised in the key information.

In step 613, in response to receiving the key information, if the receiving time of the key information is earlier than the obtaining time of the service data, the client side can discard the key information.

In step 614, if the key information is not detected and obtained when the latest display time of the service data is reached, the client side can use the second key to decrypt the service data encrypted using the second encryption algorithm.

In step 615, the client side can output the decrypted service data on the playing interface of the live-broadcasting data.

If the service data is not displayed at the latest display time, the service data is discarded.

In some embodiments, it can be ensured that the service data is synchronously output with the predetermined content in the live-broadcasting data, thereby improving the synchronous rate between the service data and the live-broadcasting data, improving the data security, and ensuring the impartiality of data output.

According to some embodiments, in a scenario of live-broadcasting question answering, the service data can comprise question information. If detecting and obtaining the key information, the client side can output an answer widget comprising the service data.

Optionally, the service data can directly be an answer widget comprising the question information.

The predetermined content in the live-broadcasting data can comprise a question answer signal broadcasted by a host at the live-broadcasting site, and the question answer signal can be broadcasted after the host broadcasts the question information.

When the live-broadcasting data comprises the predetermined content, the key information can be inserted in the live-broadcasting data, and the key information can be inserted, in the form of a SEI frame, into video data of the live-broadcasting data.

In the scenario of live-broadcasting question answering, the service data can typically be output for a predetermined duration, for example, 10 seconds, and a viewing user needs to execute an answer operation through the answer widget within the predetermined duration.

In some embodiments, it can be ensured that the questions are synchronously output with the answer instruction in the live-broadcasting data, and the question transmission security and answer impartiality can also be ensured.

Therefore, if the service data comprises the question information, in some embodiments, the step of outputting, in response to the key information, the service data on the playing interface of the live-broadcasting data comprises: outputting, in response to the key information, an answer widget comprising the service data on the playing interface of the live-broadcasting data.

The step of after the outputting, if the key information is inserted in the live-broadcasting data, the service data on the playing interface of the live-broadcasting data, can further comprises: in response to an input operation on the answer widget, obtaining user answer data.

The user answer data can be cached to the client side.

In the scenario of live-broadcasting question answering, after the user finishes answering, the host at the live-broadcasting site can also broadcast a standard answer to the question information, and at the same time, the client side can also obtain standard answer data from the server side and display the standard answer data. In order to cause the standard answer data to be synchronously output with the content broadcast by the host in the live-broadcasting data, the client side can perform the following steps: obtaining the standard answer data of the question information from the server side; detecting whether trigger information is inserted in the live-broadcasting data, the trigger information being inserted by the live-broadcasting side when the live-broadcasting data comprises live-broadcasting content corresponding to the standard answer data, wherein the live-broadcasting content can be obtained by collecting the standard answer broadcast by the host at the live-broadcasting site; and outputting, in response to the trigger information, the standard answer data and the user answer data for the question information on the playing interface of the live-broadcasting data. A determination result regarding whether the standard answer data and the user answer data are consistent can also be output.

Figure 7:
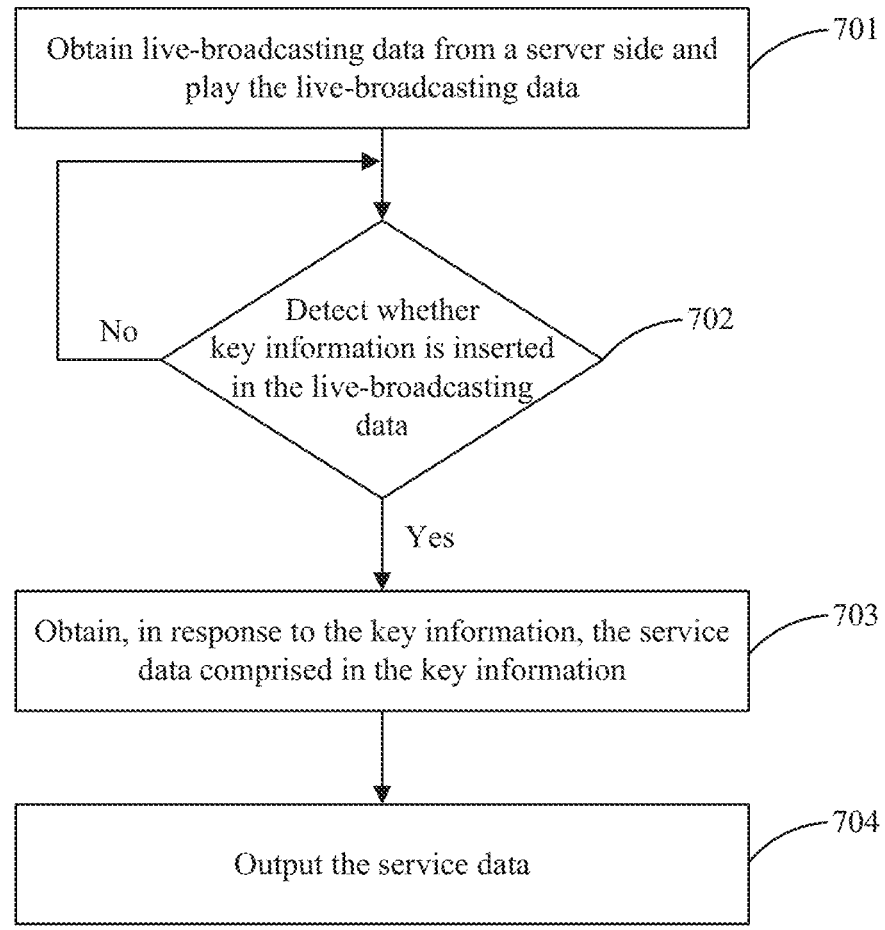
FIG. 7 is a flowchart of an exemplary live-broadcasting method, consistent with some embodiments of the present disclosure.

FIG. 7 is a flowchart of an exemplary live-broadcasting method, consistent with some embodiments of the present disclosure. The method can be performed by a client side. The method can comprise the following steps.

In step 701: live-broadcasting data is obtained from a server side and the live-broadcasting data is played.

In step 702, whether key information is inserted in the live-broadcasting data is determined, the key information being inserted by a live-broadcasting side in the live-broadcasting data when the live-broadcasting data comprises predetermined content.

The live-broadcasting data is collected by the live-broadcasting side and uploaded to the server side, and then transmitted by the server side to the client side. The server side can transmit the live-broadcasting data to the client side upon receiving a live-broadcasting request from the client side.

Here, the key information comprises service data corresponding to the predetermined content.

The server side can issue the service data corresponding to the predetermined content to the live-broadcasting side in advance, so that the live-broadcasting side inserts the key information comprising the service data in the live-broadcasting data when the live-broadcasting data comprises the predetermined content.

In step 703, in response to the key information, the service data comprised in the key information is obtained.

That is, if the key information is detected and obtained, the service data comprised in the key information is obtained.

In step 704, the service data is output on a playing interface of the live-broadcasting data, so that the service data is output synchronously with the predetermined content.

If detecting and obtaining the key information, the client side can obtain the service data comprised in the key information, and thus the service data can be output. The service data and the live-broadcasting data are issued together to the client side and have the same network latency, such that the service data can be output synchronously with the predetermined content in the live-broadcasting data, thereby improving the synchronous rate between the service data and the live-broadcasting data.

Optionally, to improve security, the service side can use a first encryption algorithm to encrypt the service data and issue the service data encrypted using the first encryption algorithm to the live-broadcasting side.

The client side can obtain a first key corresponding to the first encryption algorithm from the service side.

The step of outputting the service data on the playing interface of the live-broadcasting data can comprise: using the first key to decrypt the service data; and outputting the decrypted service data on the playing interface of the live-broadcasting data.

To further provide security, the client side can specifically obtain the first key in a valid state from the service side. If the live-broadcasting data comprises the predetermined content, the live-broadcasting side can send a control instruction to the server side at the same time when inserting key information in the live-broadcasting data. According to the control instruction, the server side can set the first key corresponding to the service data to be in the valid state, such that the client side can obtain the first key in the valid state.

Figure 8:
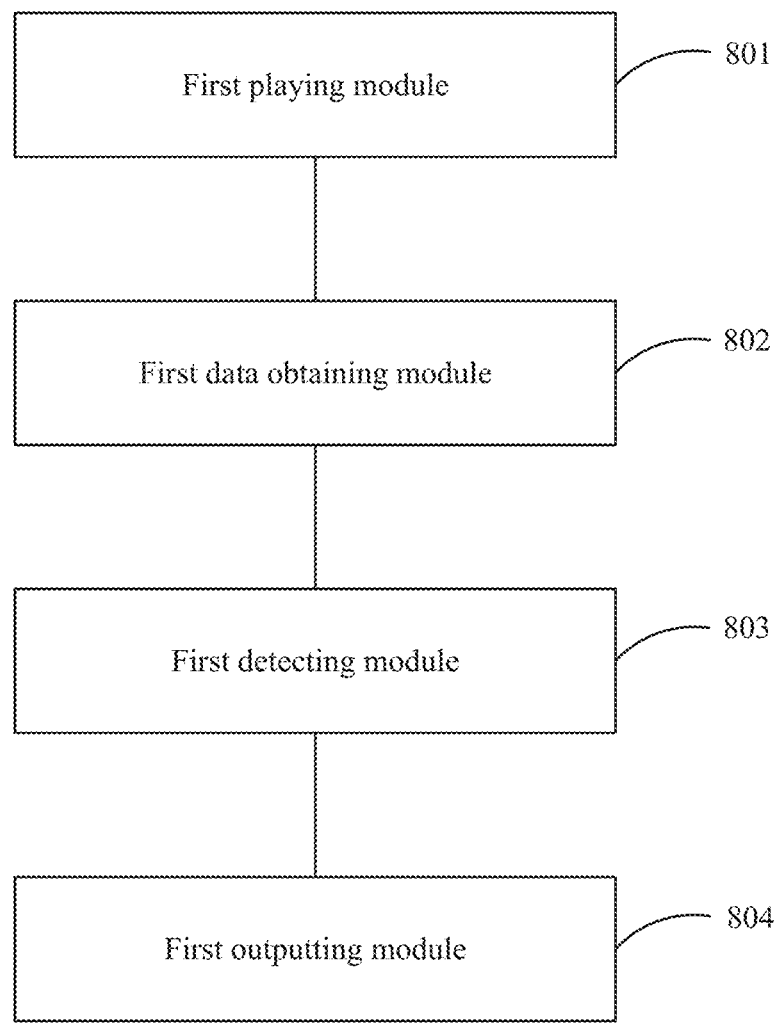
FIG. 8 is a schematic structural diagram of an exemplary live-broadcasting device, consistent with some embodiments of the present disclosure.

FIG. 8 is a schematic structural diagram of an exemplary live-broadcasting device, consistent with some embodiments of the present disclosure. The device can comprise: a first playing module 801, a first data obtaining module 802, a first detecting module 803, and a first outputting module 804.

First playing module 801 is configured to obtain live-broadcasting data from a server side and play the live-broadcasting data.

First data obtaining module 802 is configured to obtain service data from the server side and cache the service data.

First detecting module 803 is configured to detect whether key information is inserted in the live-broadcasting data, wherein the key information is inserted by a live-broadcasting side when predetermined content corresponding to the service data is included in the live-broadcasting data.

First outputting module 804 is configured to output, in response to the key information, the service data on a playing interface of the live-broadcasting data.

To ensure the data security, in some embodiments, the first data obtaining module is specifically configured to obtain service data encrypted using the first encryption algorithm from the server side.

The first outputting module is specifically configured to decrypt, in response to the key information, the service data using a first key and output the decrypted service data on the playing interface of the live-broadcasting data.

Optionally, the key information comprises the first key, and the first outputting module decrypting, in response to the key information, the service data using a first key can be: in response to the key information, using the first key comprised in the key information to decrypt the service data.

Optionally, the first outputting module decrypting, in response to the key information, the service data using a first key can be: in response to the key information, obtaining the first key from the server side; and using the first key to decrypt the service data.

In some embodiments, the first data obtaining module can be specifically configured to obtain service data in a valid state from the server side; the valid state is set by the server side in response to a control instruction from the live-broadcasting side for the service data; and the control instruction is generated by the live-broadcasting side when the live-broadcasting data comprises predetermined content.

In some embodiments, the device can further comprise: a time calculating module.

The time calculating module is configured to determine, according to an obtaining time of the service data and a predetermined latency parameter, the earliest display time and the latest display time of the service data.

The step of decrypting, in response to the key information, the service data using a first key can comprise: if the receiving time of the key information is earlier than the earliest display time of the service data, waiting until the earliest display time to use the first key to decrypt the service data; and if the receiving time of the key information is later than the earliest display time of the service data and earlier than the latest display time of the service data, using the first key to decrypt the service data.

In addition, in some embodiments, the device can further comprise: a third data obtaining module and a first data processing module.

The third data obtaining module is configured to obtain, after obtaining the service data encrypted using the first encryption algorithm, the service data encrypted using a second encryption algorithm from the server side after a first predetermined time.

The first data processing module is configured to, if the key information is not detected and obtained when the latest display time of the service data is reached, use a second key to decrypt the service data and output the decrypted service data on the playing interface of the live-broadcasting data.

In some embodiments, the first outputting module can be specifically configured to periodically access the server side to request to obtain the service data encrypted using the first encryption algorithm.

Optionally, the first predetermined time can be an interval time corresponding to a predetermined number of accesses.

In some embodiments, the device can further comprise: a time calculating module.

The time calculating module is configured to determine, according to an obtaining time of the service data and a predetermined latency parameter, the earliest display time and the latest display time of the service data.

The step of decrypting, if the key information is inserted in the live-broadcasting data, the service data using a first key can comprise: if the receiving time of the key information is earlier than the earliest display time of the service data, waiting until the earliest display time to output the service data on the playing interface of the live-broadcasting data; and if the receiving time of the key information is later than the earliest display time of the service data and earlier than the latest display time of the service data, outputting the service data on the playing interface of the live-broadcasting data.

In some embodiments, the device can further comprise: a second data processing module.

The second data processing module is configured to, if the key information is not detected and obtained when the latest display time of the service data is reached, request to obtain the service data that is not encrypted from the server side and output the service data on the playing interface of the live-broadcasting data.

In some embodiments, the first detecting module can be specifically configured to detect whether a SEI frame carrying the key information is inserted in the live-broadcasting data.

In some embodiments, the service data comprises question information.

The first outputting module is specifically configured to output, in response to the key information, an answer widget comprising the question information on the playing interface of the live-broadcasting data.

the device can further comprise: a responding module configured to obtain, in response to an input operation on the answer widget, user answer data for the question information.

In addition, in some embodiments, the device can further comprise: a fourth data obtaining module and a third outputting module.

The fourth data obtaining module is configured to detect whether trigger information is inserted in the live-broadcasting data, the trigger information being inserted by the live-broadcasting side when the live-broadcasting data comprises live-broadcasting content corresponding to the standard answer data.

The third outputting module is configured to output, in response to the trigger information, the standard answer data and the user answer data on the playing interface of the live-broadcasting data.

Figure 9:
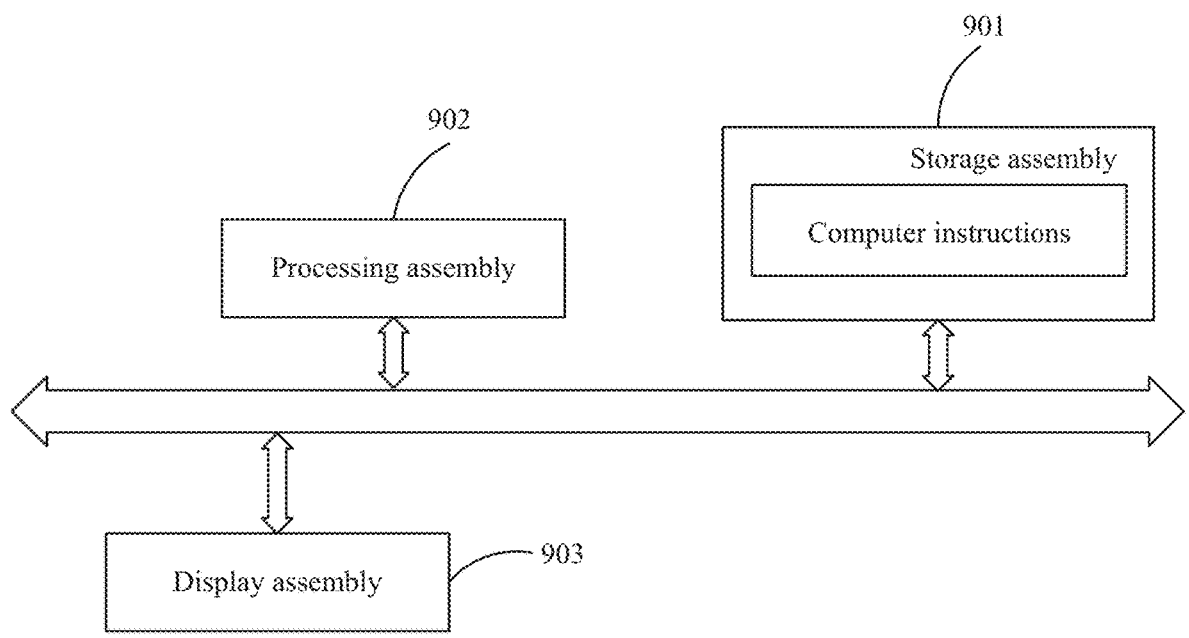
FIG. 9 is a schematic structural diagram of a an exemplary terminal, consistent with some embodiments of the present disclosure.

The network live-broadcasting device shown in FIG. 8 can be implemented as a terminal, and as shown in FIG. 9, the terminal can comprise a storage assembly 901, a processing assembly 902, and a display assembly 903.

Storage assembly 901 is configured to store one or more computer program instructions; the one or more computer program instructions being called and executed by the processing assembly; and Processing assembly 902 is configured to: obtain live-broadcasting data from a server side and play the live-broadcasting data; obtain service data from the server side and cache the service data; detect whether key information is inserted in the live-broadcasting data, wherein the key information is inserted by a live-broadcasting side when predetermined content corresponding to the service data is included in the live-broadcasting data; and in response to the key information, output the service data through a playing interface of the live-broadcasting data provided by display assembly 903, so that the service data is output synchronously with the predetermined content.

Processing assembly 902 can comprise one or more processors to execute computer instructions, so as to complete all or some steps in the above methods. Naturally, the processing assembly can also be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, and is configured to execute the above methods.

Storage assembly 901 is configured to store various types of data to support operations on the terminal. The storage assembly can be implemented by any type of volatile or non-volatile storage devices or combinations thereof, such as a static random access memory (SRAM), an electrically erasable programmable read-only memory (EEPROM), an erasable programmable read-only memory (EPROM), a programmable read only memory (PROM), a read only memory (ROM), a magnetic memory, a flash memory, a magnetic disk, or an optical disc.

Display assembly 903 can be an electroluminescent (EL) element, a liquid crystal display or a micro display with a similar structure, or a laser scanning display that can directly display on a retina or the like.

Some embodiments of the present disclosure further provide a computer readable storage medium with computer programs stored, and the computer programs can, when executed by a computer, implement the network live-broadcasting method shown in FIG. 1.

Figure 10:
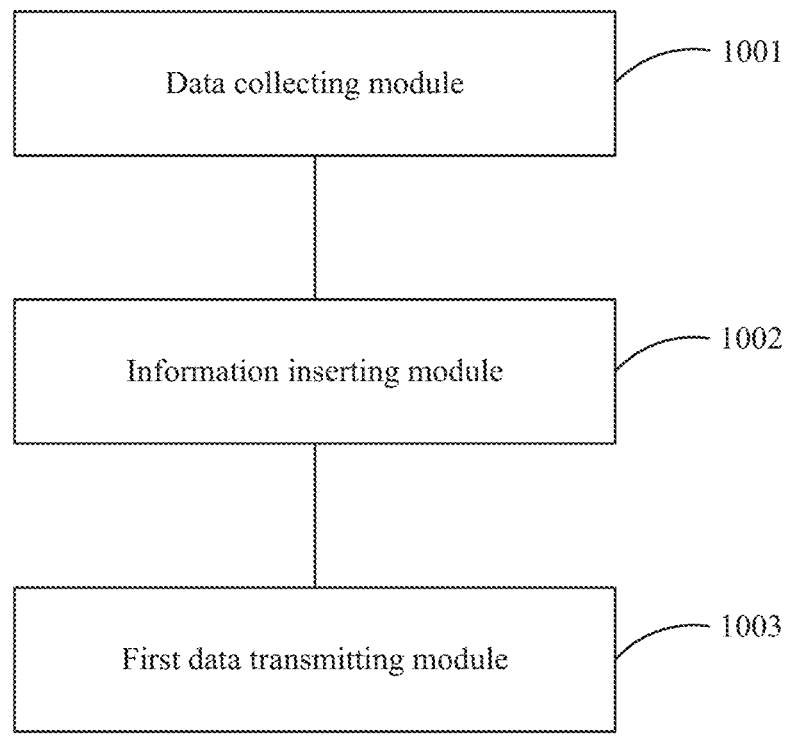
FIG. 10 is a schematic structural diagram of an exemplary live-broadcasting device, consistent with some embodiments of the present disclosure.

FIG. 10 is a schematic structural diagram of an exemplary live-broadcasting device, consistent with some embodiments of the present disclosure. The device can comprise: a data collecting module 1001, an information inserting module 1002, and a first data transmitting module 1003.

Data collecting module 1001 is configured to collect live-broadcasting data.

Information inserting module 1002 is configured to insert, if predetermined content corresponding to service data is included in the live-broadcasting data, key information corresponding to the service data in the live-broadcasting data.

First data transmitting module 1003 configured to transmit the live-broadcasting data to a server side, wherein the live-broadcasting data is transmitted to a client side for the client side to play the live-broadcasting data, and when the key information is detected and obtained from the live-broadcasting data, output the service data obtained from the server side on a playing interface of the live-broadcasting data.

In some embodiments, the device can further comprise: an instruction sending module. The instruction sending module is configured to send, if the live-broadcasting data comprises predetermined content corresponding to the service data, a control instruction to the server side, wherein the control instruction is used to trigger the service side to determine the service data corresponding to the predetermined content, and set the service data to be in a valid state for the client side to obtain.

In some embodiments, the information inserting module is specifically configured to determine, if a push request is received, that the predetermined content corresponding to the service data is included in the live-broadcasting data, and insert the key information corresponding to the service data in the live-broadcasting data.

In some embodiments, the live-broadcasting data comprises video data; and the information inserting module is specifically configured to insert, if the predetermined content corresponding to the service data is included in the live-broadcasting data, a SEI frame carrying the key information in the video data.

Figure 11:
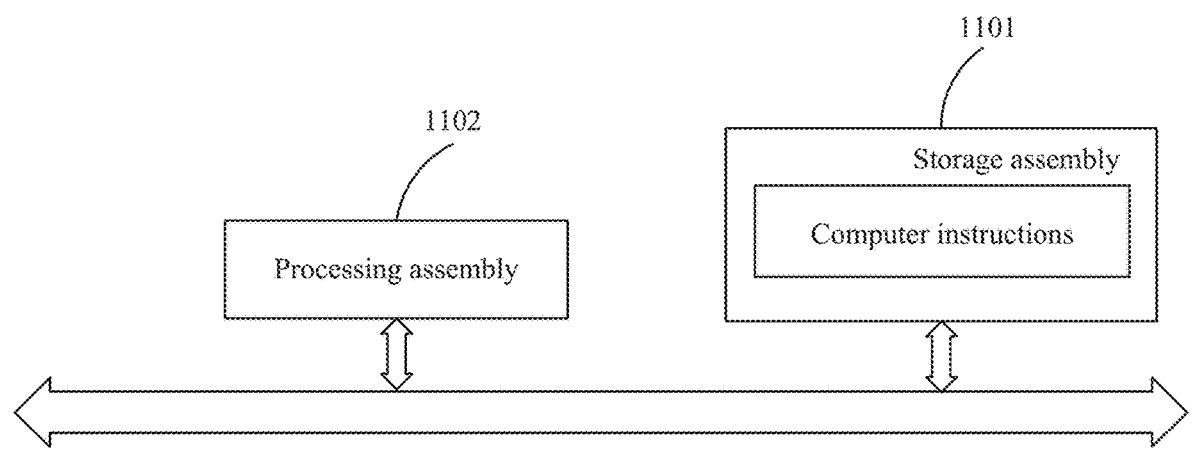
FIG. 11 is a schematic structural diagram of an exemplary terminal, consistent with some embodiments of the present disclosure.

The network live-broadcasting device shown in FIG. 10 can be implemented as a terminal, and as shown in FIG. 11, the terminal can comprise a storage assembly 1101 and a processing assembly 1102.

Storage assembly 1101 is configured to store one or more computer program instructions; the one or more computer program instructions being called and executed by the processing assembly.

Processing assembly 1102 is configured to: collect live-broadcasting data; insert, if predetermined content corresponding to service data is included in the live-broadcasting data, key information corresponding to the service data in the live-broadcasting data; and transmit the live-broadcasting data to a server side, wherein the live-broadcasting data is transmitted to a client side for the client side to play the live-broadcasting data, and when the key information is detected and obtained from the live-broadcasting data, output the service data obtained from the server side.

Here, the processing assembly 1102 can comprise one or more processors to execute computer instructions, so as to complete all or some steps in the above methods. Naturally, the processing assembly can also be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, and is configured to execute the above methods.

The storage assembly 1101 is configured to store various types of data to support operations on the terminal. The storage assembly can be implemented by any type of volatile or non-volatile storage devices or combinations thereof, such as a static random access memory (SRAM), an electrically erasable programmable read-only memory (EEPROM), an erasable programmable read-only memory (EPROM), a programmable read only memory (PROM), a read only memory (ROM), a magnetic memory, a flash memory, a magnetic disk, or an optical disc.

The embodiments of the present disclosure further provide a computer readable storage medium with computer programs stored, and the computer programs can, when executed by a computer, implement the network live-broadcasting method shown in FIG. 2.

Figure 12:
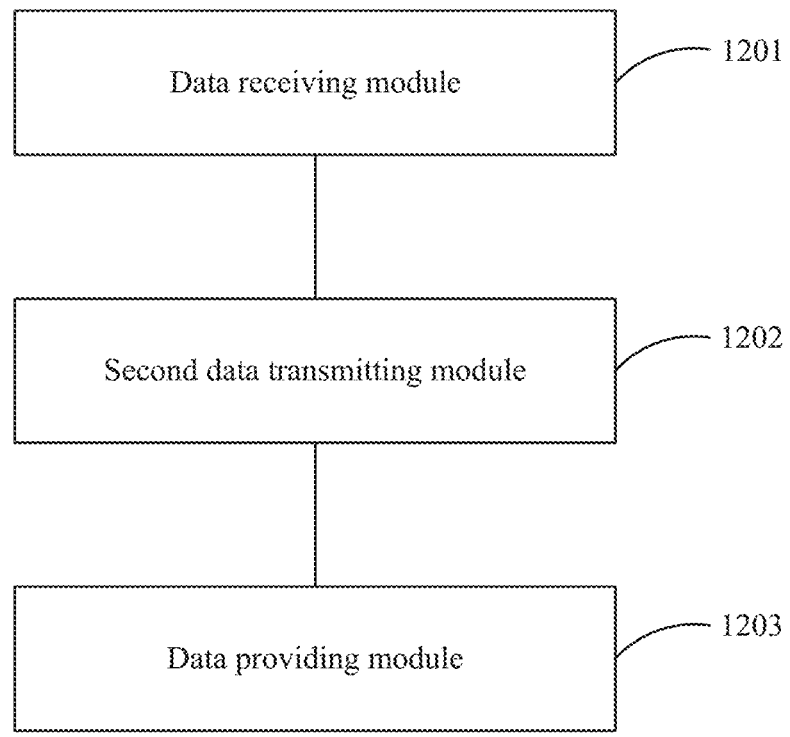
FIG. 12 is a schematic structural diagram of an exemplary live-broadcasting device, consistent with some embodiments of the present disclosure.

FIG. 12 is a schematic structural diagram of an exemplary live-broadcasting device, consistent with some embodiments of the present disclosure. The device can comprise: a data receiving module 1201, a second data transmitting module 1202, and a data providing module 1203.

Data receiving module 1201 is configured to receive live-broadcasting data uploaded by a live-broadcasting side, wherein key information is inserted when the live-broadcasting data comprises predetermined content corresponding to service data.

Second data transmitting module 1202 is configured to transmit the live-broadcasting data to a client side for the client side to play the live-broadcasting data.

Data providing module 1203 is configured to provide the service data to the client side for the client side to output the service data on a playing interface of the live-broadcasting data when the key information is detected and obtained from the live-broadcasting data.

In some embodiments, the device can further comprise: a first encrypting module. The first encrypting module configured to use a first encryption algorithm to encrypt the service data; and send a first key corresponding to the first encryption algorithm to a live-broadcasting side for the live-broadcasting side to insert key information comprising the first key when the live-broadcasting data comprises predetermined content corresponding to the service data.

The data providing module can be specifically configured to receive an obtaining request sent from the client side; and send the service data encrypted using the first encryption algorithm to the client server for the client server to, when detecting and obtaining the key information from the live-broadcasting data, decrypt the service data using the first key in the key information and output the decrypted service data on the playing interface of the live-broadcasting data.

In some embodiments, the device can further comprise: an instruction receiving module. The instruction receiving module is configured to receive a control instruction sent by the live-broadcasting side, wherein the control instruction is sent by the live-broadcasting side when the live-broadcasting data comprises predetermined content corresponding to the service data; and set the service data indicated by the control instruction to be in a valid state.

The data providing module can be specifically configured to receive an obtaining request sent from the client side; and send the service data in the valid state to the client server.

In some embodiments, the device can further comprise: a second encrypting module and a sending module.

The second encrypting module is configured to use a second encryption algorithm to encrypt the service data; and send a second key corresponding to the second encryption algorithm to the client side.

The sending module is configured to send, after a predetermined time, the service data encrypted using the second encryption algorithm to the client side for the client side to, if the key information is not detected and obtained when the latest display time of the service data is reached, use the second key to decrypt the service data encrypted using the second encryption algorithm and output the decrypted service data on the playing interface of the live-broadcasting data.

In some embodiments, the device can further comprise: a parameter setting module and a parameter providing module.

The parameter setting module is configured to set a predetermined latency parameter of the service data.

The parameter providing module is configured to provide the predetermined latency parameter to the client side for the client side to determine, according to the obtaining time of the service data and the predetermined latency parameter, the earliest display time and the latest display time of the service data; if the receiving time of the key information is earlier than the earliest display time of the service data, wait until the earliest display time to output the service data on the playing interface of the live-broadcasting data; and if the receiving time of the key information is later than the earliest display time of the service data and earlier than the latest display time of the service data, output the service data on the playing interface of the live-broadcasting data.

In some embodiments, the device can further comprise: a counting module and a parameter updating module.

The counting module is configured to count whether the receiving times of the key information at different client sides are within a display time range defined by the earliest display time and the latest display time of the service data The parameter updating module is configured to adjust, based on the counting result, the predetermined latency parameter.

Figure 13:
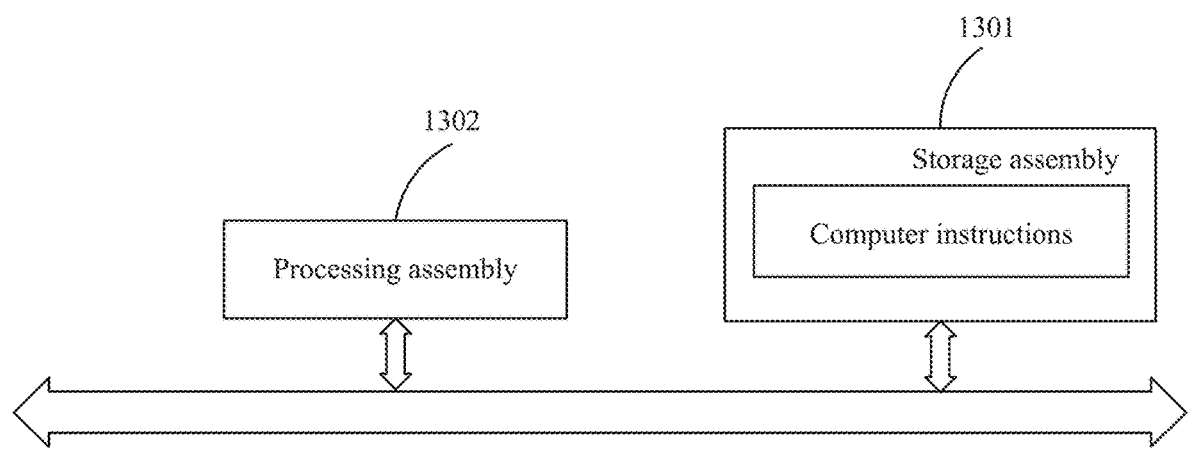
FIG. 13 is a schematic structural diagram of an exemplary server, consistent with some embodiments of the present disclosure.

The network live-broadcasting device shown in FIG. 12 can be implemented as a terminal, and as shown in FIG. 13, the terminal can comprise a storage assembly 1301 and a processing assembly 1302.

Storage assembly 1301 is configured to store one or more computer program instructions; the one or more computer program instructions being called and executed by the processing assembly.

Processing assembly 1302 is configured to: receive live-broadcasting data uploaded by a live-broadcasting side, wherein key information is inserted when the live-broadcasting data comprises predetermined content corresponding to service data; transmit the live-broadcasting data to a client side for the client side to play the live-broadcasting data; and provide the service data to the client side for the client side to output the service data on a playing interface of the live-broadcasting data when the key information is detected and obtained from the live-broadcasting data.

Here, the processing assembly 1302 can comprise one or more processors to execute computer instructions, so as to complete all or some steps in the above methods. Naturally, the processing assembly can also be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, and is configured to execute the above methods.

Storage assembly 1301 is configured to store various types of data to support operations on the terminal. The storage assembly can be implemented by any type of volatile or non-volatile storage devices or combinations thereof, such as a static random access memory (SRAM), an electrically erasable programmable read-only memory (EE-PROM), an erasable programmable read-only memory (EPROM), a programmable read only memory (PROM), a read only memory (ROM), a magnetic memory, a flash memory, a magnetic disk, or an optical disc.

The embodiments of the present disclosure further provide a computer readable storage medium with computer programs stored, and the computer programs can, when executed by a computer, implement the network live-broadcasting method shown in FIG. 3.

Figure 14:
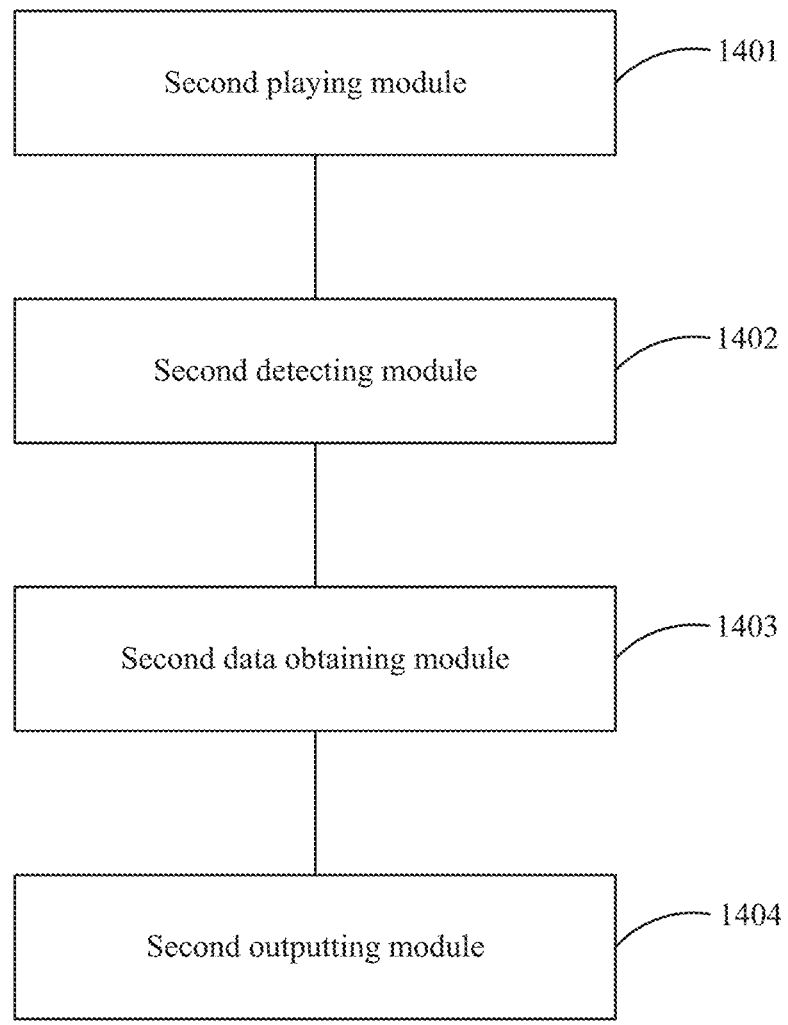
FIG. 14 is a schematic structural diagram of an exemplary live-broadcasting device, consistent with some embodiments of the present disclosure.

FIG. 14 is a schematic structural diagram of an exemplary live-broadcasting device, consistent with some embodiments of the present disclosure. The device can comprise: a second playing module 1401, a second detecting module 1402, a second data obtaining module 1403, and a second outputting module 1404.

Second playing module 1401 is configured to obtain live-broadcasting data from a server side and play the live-broadcasting data.

Second detecting module 1402 is configured to detect whether key information is inserted in the live-broadcasting data, the key information being inserted by a live-broadcasting side in the live-broadcasting data when the live-broadcasting data comprises predetermined content corresponding to service data Second data obtaining module 1403 is configured to obtain, in response to the key information, the service data comprised in the key information.

Second outputting module 1404 is configured to output the service data on a playing interface of the live-broadcasting data, so that the service data is output synchronously with the predetermined content.

In some embodiments, the service data is encrypted using a first encryption algorithm.

The device can further comprise: a key obtaining module. The key obtaining module configured to obtain a first key in a valid state from the server side; the valid state is set by the server side in response to a control instruction from the live-broadcasting side for the first key; and the control instruction is generated by the live-broadcasting side when the live-broadcasting data comprises predetermined content corresponding to the service data.

The second outputting module is specifically configured to decrypt the service data using the first key and output the decrypted service data on the playing interface of the live-broadcasting data.

Figure 15:
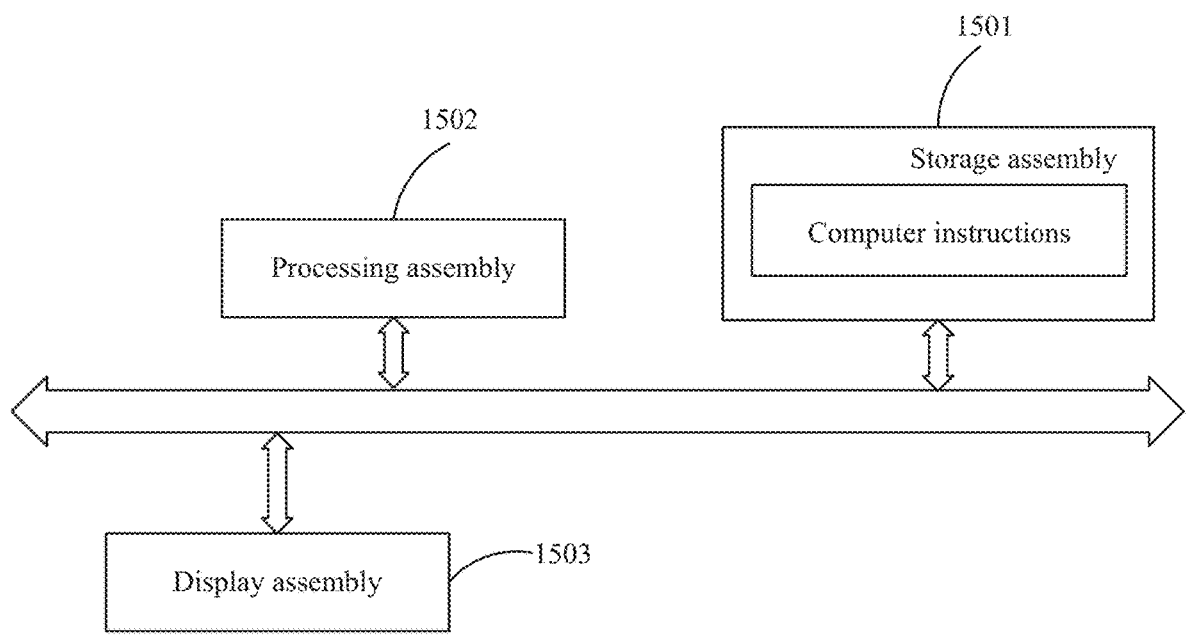
FIG. 15 is a schematic structural diagram of an exemplary terminal, consistent with some embodiments of the present disclosure.

The network live-broadcasting device shown in FIG. 14 can be implemented as a terminal, and as shown in FIG. 15, the terminal can comprise a storage assembly 1501, a processing assembly 1502, and a display assembly 1503.

Storage assembly 1501 is configured to store one or more computer program instructions; the one or more computer program instructions being called and executed by the processing assembly.

Processing assembly 1502 is configured to: obtain live-broadcasting data from a server side and play the live-broadcasting data; detect whether key information is inserted in the live-broadcasting data, the key information being inserted by a live-broadcasting side when the live-broadcasting data comprises predetermined content corresponding to service data; obtain, in response to the key information, the service data comprised in the key information; and output the service data through a playing interface for outputting the live-broadcasting data provided by the display assembly 1503, so that the service data is output synchronously with the predetermined content.

Here, processing assembly 1502 can comprise one or more processors to execute computer instructions, so as to complete all or some steps in the above methods. Naturally, the processing assembly can also be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, and is configured to execute the above methods.

Storage assembly 1501 is configured to store various types of data to support operations on the terminal. The storage assembly can be implemented by any type of volatile or non-volatile storage devices or combinations thereof, such as a static random access memory (SRAM), an electrically erasable programmable read-only memory (EEPROM), an erasable programmable read-only memory (EPROM), a programmable read only memory (PROM), a read only memory (ROM), a magnetic memory, a flash memory, a magnetic disk, or an optical disc.

Display assembly 1503 can be an electroluminescent (EL) element, a liquid crystal display or a micro display with a similar structure, or a laser scanning display that can directly display on a retina or the like.

The embodiments of the present disclosure further provide a computer readable storage medium with computer programs stored, and the computer programs can, when executed by a computer, implement the network live-broadcasting method shown in FIG. 7.

As used herein, unless specifically stated otherwise, the term "or" encompasses all possible combinations, except where infeasible. For example, if it is stated that a device may include A or B, then, unless specifically stated otherwise or infeasible, the device may include A, or B, or A and B. As a second example, if it is stated that a device may include A, B, or C, then, unless specifically stated otherwise or infeasible, the device may include A, or B, or C, or A and B, or A and C, or B and C, or A and B and C.

Based on the several embodiments provided in the present disclosure, it should be appreciated that the disclosed technical contents may be implemented in another manner. The described apparatus, system, and method embodiments are only exemplary. For example, division of units or modules are merely exemplary division based on the logical functions. Division in another manner may exist in actual implementation. Further, a plurality of units or components may be combined or integrated into another system. Some features or components may be omitted or modified in some embodiments. In addition, the mutual coupling or direct coupling or communication connections displayed or discussed may be implemented by using some interfaces. The indirect coupling or communication connections between the units or modules may be implemented electrically or in another form.

In some embodiments, a non-transitory computer-readable storage medium including instructions is also provided, and the instructions may be executed by a device for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

It is appreciated that the above descriptions are only exemplary embodiments provided in the present disclosure. Consistent with the present disclosure, those of ordinary skill in the art may incorporate variations and modifications in actual implementation, without departing from the principles of the present disclosure. Such variations and modifications shall all fall within the protection scope of the present disclosure.

What is claimed is:

1. A network live-broadcasting method, comprising:
obtaining live-broadcasting data from a server side at a client side;
obtaining service data from the server side at the client side, wherein the service data is separate from the live-broadcasting data;
storing the service data at the client side;
determining whether the obtained live-broadcasting data contains key information, wherein the key information is inserted by a live-broadcasting side in the live-broadcasting data when predetermined content corresponding to the service data is included in the live-broadcasting data;
determining, according to an obtaining time of the service data and a latency parameter, an earliest display time and a latest display time of the service data; and
outputting, in response to receiving the key information, the stored service data on a playing interface of the live-broadcasting data at the client side, so that the stored service data is output synchronously with the predetermined content of the live-broadcasting data at the client side, wherein the outputting comprises:
in response to the receiving time of the key information being earlier than the earliest display time of the service data, waiting until the earliest display time of the service data to output the stored service data on the playing interface of the live-broadcasting data at the client side; or
in response to the receiving time of the key information being later than the earliest display time of the service data and earlier than the latest display time of the service data, immediately outputting the stored service data on the playing interface of the live-broadcasting data at the client side.

2. The method according to claim 1, wherein obtaining the service data from the server side at the client side comprises:
 obtaining the service data encrypted using a first encryption algorithm from the server side; and
 outputting, in response to receiving the key information, the stored service data on the playing interface of the live-broadcasting data at the client side comprises:
  decrypting, in response to receiving the key information, the stored service data using a first key; and
  outputting the decrypted stored service data on the playing interface of the live-broadcasting data at the client side.

3. The method according to claim 2,
 wherein decrypting, in response to receiving the key information, the stored service data using the first key comprises:
  in response to the receiving time of the key information being earlier than the earliest display time of the service data, decrypting the stored service data at the earliest display time of the stored service data using the first key; or
  in response to the receiving time of the key information being later than the earliest display time of the service data and earlier than the latest display time of the service data, immediately decrypting the stored service data using the first key.

4. The method according to claim 3, further comprising:
 after obtaining the service data encrypted using the first encryption algorithm, obtaining the service data encrypted using a second encryption algorithm from the server side after a first time; and
 in response to a determination that the key information has not been detected and obtained from the live-broadcasting data when the latest display time of the service data is reached, decrypting the service data using a second key and outputting the decrypted service data on the playing interface of the live-broadcasting data at the client side.

5. The method according to claim 4, wherein the first time is an interval time corresponding to a number of accesses to the server side to obtain the service data.

6. The method according to claim 3, wherein obtaining service data encrypted using the first encryption algorithm from the server side comprises:
 periodically accessing the server side to request the service data encrypted using the first encryption algorithm.

7. The method according to claim 1, wherein the service data includes question information.

8. A network live-broadcasting apparatus, comprising:
 a memory storing a set of instructions; and
 one or more processors configured to execute the set of instructions to cause the apparatus to perform:
  obtaining live-broadcasting data from a server side at a client side;
  obtaining service data from the server side at the client side, wherein the service data is separate from the live-broadcasting data;
  storing the service data at the client side;
  determining whether the obtained live-broadcasting data contains key information, wherein the key information is inserted by a live-broadcasting side in the live-broadcasting data when predetermined content corresponding to the service data is included in the live-broadcasting data;
  determining, according to an obtaining time of the service data and a latency parameter, an earliest display time and a latest display time of the service data; and
  outputting, in response to receiving the key information, the stored service data on a playing interface of the live-broadcasting data at the client side, so that the stored service data is output synchronously with the predetermined content of the live-broadcasting data at the client side, wherein the outputting comprises:
   in response to the receiving time of the key information being earlier than the earliest display time of the service data, waiting until the earliest display time of the service data to output the stored service data on the playing interface of the live-broadcasting data at the client side; and
   in response to the receiving time of the key information being later than the earliest display time of the service data and earlier than the latest display time of the service data, immediately outputting the stored service data on the playing interface of the live-broadcasting data at the client side.

9. The apparatus according to claim 8, wherein the one or more processors configured to execute the set of instructions to cause the apparatus to further perform:
 obtaining the service data from the server side at the client side comprises:
  obtaining the service data encrypted using a first encryption algorithm from the server side; and
  outputting, in response to receiving the key information, the stored service data on the playing interface of the live-broadcasting data at the client side comprises:
   decrypting, in response to receiving the key information, the stored service data using a first key; and
   outputting the decrypted stored service data on the playing interface of the live-broadcasting data at the client side.

10. The apparatus according to claim 9, wherein the one or more processors configured to execute the set of instructions to cause the apparatus to further perform:
 wherein decrypting, in response to receiving the key information, the stored service data using the first key comprises:
  in response to the receiving time of the key information being earlier than the earliest display time of the service data, decrypting the stored service data at the earliest display time of the stored service data using the first key; or
  in response to the receiving time of the key information being later than the earliest display time of the service data and earlier than the latest display time of the service data, immediately decrypting the stored service data using the first key.

11. The apparatus according to claim 10, wherein the one or more processors configured to execute the set of instructions to cause the apparatus to further perform:
 after obtaining the service data encrypted using the first encryption algorithm, obtaining the service data encrypted using a second encryption algorithm from the server side after a first time; and
 in response to a determination that the key information has not been detected and obtained from the live-broadcasting data when the latest display time of the service data is reached, decrypting the service data using a second key and outputting the decrypted service data on the playing interface of the live-broadcasting data at the client side.

12. The apparatus according to claim 11, wherein the first time is an interval time corresponding to a number of accesses to the server side to obtain the service data.

13. The apparatus according to claim 10, wherein obtaining service data encrypted using the first encryption algorithm from the server side comprises:
periodically accessing the server side to request the service data encrypted using the first encryption algorithm.

14. A non-transitory computer readable medium that stores a set of instructions that is executable by at least one processor of a computer to cause the computer to perform a network live-broadcasting method, the method comprising:
obtaining live-broadcasting data from a server side at a client side;
obtaining service data from the server side at the client side, wherein the service data is separate from the live-broadcasting data;
storing the service data at the client side;
determining whether the obtained live-broadcasting data contains key information, wherein the key information is inserted by a live-broadcasting side in the live-broadcasting data when predetermined content corresponding to the service data is included in the live-broadcasting data;
determining, according to an obtaining time of the service data and a latency parameter, an earliest display time and a latest display time of the service data; and
outputting, in response to receiving the key information, the stored service data on a playing interface of the live-broadcasting data at the client side, so that the stored service data is output synchronously with the predetermined content of the live-broadcasting data at the client side, wherein the outputting comprises:
in response to the receiving time of the key information being earlier than the earliest display time of the service data, waiting until the earliest display time of the service data to output the stored service data on the playing interface of the live-broadcasting data at the client side; or
in response to the receiving time of the key information being later than the earliest display time of the service data and earlier than the latest display time of the service data, immediately outputting the stored service data on the playing interface of the live-broadcasting data at the client side.

15. The non-transitory computer readable medium of claim 14, wherein the at least one processor configured to execute the set of instructions to cause the computer to further perform:

obtaining the service data from the server side at the client side comprises:
obtaining the service data encrypted using a first encryption algorithm from the server side; and
outputting, in response to receiving the key information, the stored service data on the playing interface of the live-broadcasting data at the client side comprises:
decrypting, in response to receiving the key information, the stored service data using a first key; and
outputting the decrypted stored service data on the playing interface of the live-broadcasting data at the client side.

16. The non-transitory computer readable medium of claim 15, wherein the at least one processor configured to execute the set of instructions to cause the computer to further perform:
wherein decrypting, in response to receiving the key information, the stored service data using the first key comprises:
in response to the receiving time of the key information being earlier than the earliest display time of the service data, decrypting the stored service data at the earliest display time of the stored service data using the first key; or
in response to the receiving time of the key information being later than the earliest display time of the service data and earlier than the latest display time of the service data, immediately decrypting the stored service data using the first key.

17. The non-transitory computer readable medium of claim 16, wherein the at least one processor configured to execute the set of instructions to cause the computer to further perform:
after obtaining the service data encrypted using the first encryption algorithm, obtaining the service data encrypted using a second encryption algorithm from the server side after a first time; and
in response to a determination that the key information has not been detected and obtained from the live-broadcasting data when the latest display time of the service data is reached, decrypting the service data using a second key and outputting the decrypted service data on the playing interface of the live-broadcasting data at the client side.

18. The non-transitory computer readable medium of claim 17, wherein the first time is an interval time corresponding to a number of accesses to the server side to obtain the service data.

* * * * *